United States Patent [19]

Jackson et al.

[11] 3,878,141

[45] *Apr. 15, 1975

[54] WELLBORE FLUID LOSS ADDITIVE COMPOSITION

[75] Inventors: Jack M. Jackson; Arlynn H. Hartfiel, both of Houston, Tex.

[73] Assignee: Chemical Additives Company, Houston, Tex.

[ * ] Notice: The portion of the term of this patent subsequent to Jan. 15, 1991, has been disclaimed.

[22] Filed: Oct. 12, 1973

[21] Appl. No.: 405,883

Related U.S. Application Data

[62] Division of Ser. No. 228,862, Feb. 24, 1972, Pat. No. 3,785,438.

[52] U.S. Cl.......... 260/17 R; 252/8.5 C; 252/8.5 LC
[51] Int. Cl............................................. C08b 21/32
[58] Field of Search.................. 260/17 R, 17 A; 252/8.5 LC, 8.5 C

[56] References Cited
UNITED STATES PATENTS
3,506,644 4/1970 Parker............................ 252/8.5 C FOREIGN PATENTS OR APPLICATIONS
539,116 4/1957 Canada........................... 252/8.5 LC OTHER PUBLICATIONS
Chem. Abst. 59: 15086, Diener, "Protective Colloids in Deep Wellmuds–Demands & Limits."

*Primary Examiner*—Morris Liebman
*Assistant Examiner*—Edward Woodberry
*Attorney, Agent, or Firm*—Kenneth H. Johnson

[57] ABSTRACT

The novelty lies in the use of a group of thermoplastic resins in the form of solid particles which serve as bridging materials, i.e., they plug the pores and fissures of a porous zone of wellbore formation and form a base on which a filter cake may form. The bridging particles are incorporated in the circulating fluid, and are deposited therefrom on the porous formation. The composition of the bridging particles is best described as a saturated thermoplastic resin derived from the polymerization of hydrocarbons; the resin is preferably amorphous or crystalline, and has a relatively high melting point, considerably higher than the temperatures in the wellbore, so that in its preparation it can be mechanically crushed and in use has sufficient strength to avoid deformation. The site of the particles is essentially greater than 50 microns. The class of resins suitable for the purpose is essentially insoluble in aqueous wellbore fluids, but is soluble in produced hydrocarbon fluids such as oil and condensate.

After bridging the pores and fissures with such resin, fluid loss control is established by the use of colloidal additives such as lignosulfonates complexed with a trivalent cation and a divalent base. Pressure in the wellbore fluid is maintained at a pressure exceeding the formation fluid pressure during all operations being performed, e.g., drilling through the productive zone, running in casing, cementing, etc. When the well is properly prepared for production, fluid pressure within the wellbore is reduced below the formation pressure, and oil in the formation flows toward the hole. The plug is dissolved by the oil itself, owing to the solubility of the bridging particles in the oil, and production is commenced without the need for acidizing, mechanical abrasion of the plugged zone, or the like.

1 Claim, No Drawings

WELLBORE FLUID LOSS ADDITIVE COMPOSITION

This application is a division of Ser. No. 228,862 filed Feb. 24, 1972 now U.S. Pat. No. 3,785,438.

At various stages in its history, a wellbore formed for the production of oil or gas is filled with a standing or circulating fluid, usually aqueous in nature. Such fluids vary widely in their basic compositions, from the argillaceous bentonite muds commonly used in drilling to brines, clear water, and various emulsions; the present invention is concerned in particular with non-argillaceous fluids such as brines and clear waters, though it may also be compatible with clay-based fluids, and even more particularily with additives to such fluid which prevent the loss of such fluids into porous formations. The class of additives encompassed by the invention is useful in any porous formation where loss of fluid is likely to occur, and is particularly useful in porous formations where production of oil or gas is to occur.

In most porous or fractured formations where loss of fluid is a good possibility, it is generally necessary to add two types of fluid loss preventing materials, a bridging material which fills the larger pores and larger portions of the fissures, and a smaller size of particulate material which fills in the narrower spaces between the bridging particles. The present invention is particularily concerned with a bridging additive, one which is deposited first to commence the process of establishing fluid loss control and is followed by the deposition of finer material to complete such control.

While many bridging particle additives are known in the prior art, most of them suffer from one defect or another. In particular, most such bridging materials are insoluble in both aqueous fluids and produced fluids, forming a solid plug which cannot be readily dissolved. With such materials, it is frequently necessary to use an intermediate step before production can be established. It is insufficient merely to reverse the pressure differential so that the pressure in the wellbore fluid is lower than the pressure in the formation fluid. The zone involved must frequently be treated with acid to dissolve the bridging material, or an equally expensive process of mechanically abrading the entrenched material must be resorted to.

Another disadvantage of some prior art bridging materials is high specific gravity, of the order of 2.7. Such dense materials tend to sediment rapidly (being insoluble in the circulating fluid) unless undesirably large amounts of gelling agents are added to the circulating fluid.

Another approach manifest in the prior art is the use of a single material or blend to accomplish both bridging and sealing of porous formations. The innovators who used this approach selected various hydrocarbons characterized by their plasticity at predictable downhole temperatures, relying on their particles first to bridge over pores and fissures, then to squeeze out under pressure to entirely fill the tiny spaces remaining. While the technique may work under ideal conditions, it is highly temperature dependent and hence subject to failure if actual temperatures are appreciably different from the softening points of the deformable particles.

It is the primary object of this invention to furnish methods and means for temporarily bridging the pores and fissures of an earthen formation surrounding a wellbore zone, and subsequently removing the bridge merely by reducing the pressure of the wellbore fluid below that of the hydrocarbon fluids in the formations.

Another object of the present invention is a method of establishing fluid loss control in a wellbore with the assistance of a wellbore fluid additive amenable to crushing and grinding to a range of particle sizes suitable for bridging the pores, fractures and fissures of a rock formation without experiencing appreciable deformation therein, such additives being insoluble in aqueous wellbore fluids but soluble in oil and distillates.

A further object is to provide such an additive having a softening point well above the downhole temperatures experienced in a wellbore.

A further object is to provide such an additive which is chemically inert to other materials added to aqueous wellbore fluids for various purposes.

A further object of this invention is to provide a bridging solid whose specific gravity is substantially the same as that of the fluid in which it is suspended.

Yet another objective is to provide methods and means for establishing bridges over pores and fissures of a rock formation with particles that are soluble in produced hydrocarbons but do not deform in place.

BRIEF STATEMENT OF THE INVENTION

The present inventors have discovered that there are certain resins which meet all of the above objects and are readily available for use. Each such resin may be described as a thermoplastic resin derived from the polymerization of hydrocarbons, having an amorphous or crystalline structure which allows it to be crushed and ground at room temperatures while retaining its strength thereafter so that it remains non-deformable when subjected to pressure in the pores and fissures of a rock formation, being insoluble in aqueous wellbore fluids but soluble in crude oils and gas distillates, and having a melting point well above the range of high temperatures typically encountered at the bottom of a wellbore. After crushing or grinding to proper size, the resin additive has a range of particle sizes lying essentially between +325 mesh and −20 mesh, or between 44.5 and 840.0 microns. These resins are essentially inert, showing little or no affinity or reaction to such other additives as calcium lignosulfonate, chromium salts, strong and weak bases, starches and the like. Both laboratory tests and field tests have shown these resins to be ideal bridging materials, being readily deposited with collodial fluid loss additives to seal off a formation and readily soluble in produced hydrocarbons to dissolve the seal and clean the pores to permit the flow of such hydrocarbons into a wellbore.

A specific such bridging additive discovered by the present inventors is Inkovar AB-180, a product of the Pennsylvania Industrial Chemical Corporation, of Clairton, Pennsylvania. This material may be purchsed in solid or flake form, and is readily crushed and ground by ordinary equipment. It meets the qualifications set forth above and specifically has a softening point of 183°C (360°F), and a specific gravity of 1.08. Other resins supplied by the Pennsylvania Industrial Chemical Corporation which are suitable as bridging additives of the present invention are Inkovar 145, Inkovar 146, Inkovar 150, Inkovar AB-165, and Inkovar 180. Two such resins which are also suitable and are manufactured by Reichhold Chemicals, Inc., are Sta-Tac and Super Sta-Tac 100. Another group are manufactured by the Neville Chemical Company: a group of coumarone-indene resins, Cumar R-1, R-2, etc., through Cumar R-16, and Paradene No. 2; LX-685, LX-686, etc., through LX-1050, and also LX-1027 and LX-1035; a group of alkylated aromatic resins sold under the names of Nevchem 100, Nevchem 110, Nevchem 111, etc., through Nevchem 140, and also Neville LX-1517; and a pair of aromatic hydrocarbon derived resins known as Nebony 100 and Nebony 100-A; and a pair of resins supplied by Ziegler Chemical and Mineral Corporation, Zecorez 700 and Zecorez 711, described as hydrocarbon resins made from selected reactable aromatic petroleum monomers.

EXAMPLE OF THE INVENTION

The invention was tested by a core damage test, one in which a test fluid is first caused to flow axially through a standard size rock specimen, a 1-inch diameter by 2½-inch long cylinder of Berea sandstone secured in a rubber sleeve in such a manner that there can be no leakage around the core.

The core was first evacuated, saturated in 13% NaCl brine, and then placed in the test device with both end faces in contact with kerosene. A pressure differential of 15 psi was applied across the end faces and the rate of flow of fluid through the specimen was measured. From this the initial permeability, $K_{oi}$, was calculated, according to D'Arcy's formula:

$$K = \frac{QL\mu}{A(p1-p2)}$$

(See p. 660 of Uren, Petroleum Production Engineering-Oil Field Development, 4th edition: McGraw-Hill, New York, 1956)

Following the determination of initial permeability the core was subjected for 30 minutes to the fluid under test, at 1000 psi, and the amount of fluid displaced from the low pressure face was recorded (flow stopping altogether before the 30-minute period was complete).

The test fluid was then replaced by kerosene, and flow was reestablished at the same 15 psi pressure difference. This condition was allowed to continue until the flow rate of the kerosene was stabilized and recorded. Final permeability $K_{oF}$ was calculated by the same formula, and the "damage index" calculated according to the relationship:

$$\text{Damage Index} = \frac{\% \text{ Ko decrease}}{\text{Pore fluid displaced, ml} \times 10}$$

The following results were obtained:

|  | Invention Fluid | Control Fluid |
|---|---|---|
| $K_{oi}$, millidarcys | 424 | 336 |
| Pore fluid displaced (milliliters) ml. | 0.65 | 0.7 |
| $K_{oF}$, millidarcys | 423 | 294 |
| Ratio $K_{oF}/K_{oi}$ | 99.7% | 87.5% |
| Damage Index | 0.046 | 1.8 |

The composition of the "invention fluid" was a barrel of 13% NaCl brine with the following additives:

| | |
|---|---|
| Calcium lignosulfonate | 8.287 lbs. |

-Continued

| | |
|---|---|
| Lime hydrate | 0.276 lb. |
| Magnesite | 1.105 lbs. |
| Chrome alum | 0.276 lb. |
| Inkovar | 33.149 lbs. |
| Hydroxy ethyl cellulose | 2.762 lbs. |
| Starch | 4.144 lbs. |

*modified hydrocarbon polymer having: color (Coal Tar) 3½; rosin color F-E; softening pt. 183° C. Acid No., max. <1; saponification No., max. <1; specific gravity 1.08; soluble in aromatics, insoluble in alcohols and glycols.

The composition of the control fluid was the same as that of the invention fluid with the exception that all of the Inkovar was replaced with a like weight of calcium carbonate.

This example indicates: 1) the effectiveness of the fluid loss control additives of the present invention, only a few drops of fluid (less than 1 ml.) being forced through the specimen, and 2) the virtually complete recovery (99.7%) of the original permeability of the specimen as contrasted with the marked decrease of the prior art control additives.

The invention claimed is:

1. A non-argillaceous fluid loss composition consisting essentially of a major amount of low density chemically inert bridging particles of a solid hydrocarbon thermoplastic resin, said bridging particles being nondeformable, having a high softening point well above bottom hole temperatures, consisting essentially of particles larger than 50 microns up to 840.0 microns and being both insoluble in a circulating fluid and soluble in oil and gas condensates; and a minor amount of hydroxyethyl cellulose fluid loss additive adapted to form colloidal particles in a circulating fluid.

* * * * *

UNITED STATES PATENT OFFICE
CERTIFICATE OF CORRECTION

PATENT NO. : 3,878,141

DATED : April 15, 1975

INVENTOR(S) : Jack M. Jackson & Arlynn H. Hartfiel

It is certified that error appears in the above-identified patent and that said Letters Patent are hereby corrected as shown below:

Column 4, lines 16-25 reads

"Calcium lignosulfonate         8.287 lbs.
             -Continued
Lime hydrate                    0.276 lbs.
Magnesite                       1.105 lbs.
Inkovar 33.149 lbs.
Hydroxy ethyl cellulose         2.762 lbs.
Starch                          4.144 lbs.

*modified hydrocarbon polymer having: color (Coal Tar) 3½:rosin color F-E: softening pt. 183°C. Acid No. Max. < 1:saponification No. max. < 1:specific gravity 1.08; soluble in aromatics, insoluble in alcohols and gylcols."

UNITED STATES PATENT OFFICE
CERTIFICATE OF CORRECTION

PATENT NO. : 3,878,141                        Page 2 of 2
DATED : April 15, 1975
INVENTOR(S) : Jack M. Jackson & Arlynn H. Hartfiel It is certified that error appears in the above-identified patent and that said Letters Patent are hereby corrected as shown below:

Cont'd - but should read --

| | |
|---|---|
| Calcium lignosulfonate | 8.287 lbs. |
| Lime hydrate | 0.276 lb. |
| Magnesite | 1.105 lbs. |
| Chrome alum | 0.276 lb. |
| Inkovar AB-180* | 33.149 lbs. |
| Hydroxy ethyl cellulose | 2.762 lbs. |
| Starch | 4.144 lbs. |

* modified hydrocarbon polymer having: color (Coal Tar) 3½:rosin color F-E: softening pt. 183°C. Acid No. max. < 1:saponification No., max. < 1:specific gravity 1.08; soluble in aromatics, insoluble in alcohols and glycols. --

Signed and Sealed this

Twenty-ninth Day of May 1979

[SEAL]

Attest:

RUTH C. MASON
Attesting Officer

DONALD W. BANNER
Commissioner of Patents and Trademarks